United States Patent
Harris

(10) Patent No.: US 7,966,284 B2
(45) Date of Patent: *Jun. 21, 2011

(54) PREFERENCE SETTING IN A COMPUTER SYSTEM

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/860,871

(22) Filed: Aug. 21, 2010

(65) Prior Publication Data

US 2010/0316354 A1 Dec. 16, 2010

Related U.S. Application Data

(62) Division of application No. 11/956,334, filed on Dec. 13, 2007, now Pat. No. 7,788,219.

(51) Int. Cl.
G06F 17/00 (2006.01)

(52) U.S. Cl. ........ 707/609; 707/769; 707/802; 709/217; 725/37; 725/46

(58) Field of Classification Search .................. 707/609, 707/705, 769, 802, 821; 709/217; 725/37, 725/46

See application file for complete search history.

(56) References Cited

U.S. PATENT DOCUMENTS

| 6,400,996 | B1 | 6/2002 | Hoffberg et al. | |
|---|---|---|---|---|
| 7,184,939 | B1 | 2/2007 | Trowbridge et al. | |
| 7,571,248 | B2 | 8/2009 | Kutsumi et al. | |
| 2005/0185921 | A1* | 8/2005 | Skran et al. | 386/52 |
| 2008/0010253 | A1 | 1/2008 | Sidhu et al. | |
| 2008/0126176 | A1 | 5/2008 | Iguchi | |

OTHER PUBLICATIONS

Cox, Digital Video Recorder, 2004 Cox, pp. 1-20.*
Church et al., The use of digital Video recorders (DVRs) for capturing digital video files for use in both The Observer and Ethovision, 2006 Psychonomic Society, pp. 434-438.*
X10, "Indoor/Outdoor Color Camera," Published: Nov. 7, 2002.
Jeremy Goecks et al., "Learning Users Interests ...," Published: Nov. 18, 2000.
Larev, "Benefits of Power Management," Published: 2006.
DssW, "Power Manager 3 for Mac OS X," Filed: Sep. 1, 2005.
Dinesh Rajan et al., "Resource Access Pattern Mining for Dynamic Energy Management," Proceedings of the Workshop on Autonomic Computing: A New Challenge for Machine Learning, Berlin, Germany, Sep. 2006.

* cited by examiner

*Primary Examiner* — Fred I Ehichioya
(74) *Attorney, Agent, or Firm* — Law Office of Scott C. Harris, Inc.

(57) ABSTRACT

A profile of likelihoods of actions that will occur on a computer is stored. The computer may be likely to be off between time periods, e.g., between midnight and 7 am. Some action is taken relative to the actions that are likely to occur, before those actions actually happen.

11 Claims, 2 Drawing Sheets

PREFERENCE SETTING IN A COMPUTER SYSTEM

BACKGROUND

Personal computer systems have become very sophisticated, providing many different settings that are available to a user. One such setting, described further herein, includes the settings applied to a screen saver, e.g., the time until the computer enters screen saver mode, and the specific thing that forms the screen save once activated.

There are many other similar settings which a user can set.

More often than not, however, users, and especially novice users, simply accept the default settings, and use those settings with their computer.

The screen saver, for example, has the purpose of turning off the display and saving energy. There are other energy-saving settings on the computer.

Perhaps the most aggressive power savings is to turn off the computer completely, thereby saving as much as 400-500 W. However, improperly turning off the computer is an annoyance to the user; since they must turn it back on. Being too aggressive with these power savings settings requires the user to wait for actions to occur: for the screen to come back on, for the hard drive to spin back up, or the like.

Other computer-based devices, such as portable telephones, and digital video recorders, have similar issues with settings.

SUMMARY

An embodiment describes obtaining and using of statistical profiles of actions taken by a user and using those statistical profiles as part of further actions to be taken by the user.

One aspect forms a profile based on actions and aspects which are taken at different times responsive to different actions. The profiles can be adaptively formed according to the user's specific reactions to specific actions.

Another aspect sets exemplary profiles which have specific characteristics which represent the way that a user uses their computer. These exemplary profiles can be associated with given names, such as "Bob". Users like Bob use their computer in a specified way. The computer user can select the user profile that is most like themselves. That profile indicates actions of the computer, indicating what a user like the current user typically does. The user selection of the user closest to themselves allows automatic configuration of the computer in a way that is likely a way that the current user would want.

Another embodiment uses these settings with other computer-based devices, such as a portable telephone or DVR.

BRIEF DESCRIPTION OF THE DRAWINGS

These and other aspects will now be described in detail with reference to the accompanying drawings, wherein.

DETAILED DESCRIPTION

Computers and computer based devices require a number of different settings.

One such setting, for example, is the settings needed for a screen saver, e.g., the saver used to blank the screen after a specified amount of time. There may be many reasons for this. One reason is to save the phosphorous on the screen. Another reason is to save energy, by turning off the screen, which is typically the most power intensive part of the computer.

Another setting is whether a hard drive or other storage device within the computer is active. The hard drives may consume power, may be noisy, and may enjoy increased life if they are turned off for parts of their operation time.

Programs which are running may fool the screensaver controlling program and prevent the program from taking operations like blanking the screen or turning off a hard drive, called generically an action. Being too aggressive in causing the action, however, can be annoying to a user, when they do not want the screen to go blank or the hard drive to go off. Settings can be used to determine when the action should be taken. More aggressive settings can power-down the hard drive, the processor, the fan, the power supply or any other part. Very aggressive power settings are also possible, including putting the computer into the so called S1 state in which it uses very little energy. However, it is important to determine when these states should be used.

The present application determines—given the usual habits of a user, and what that user is doing at any specific time, what is likely to be the way to configure the computer based on those usual habits.

The habits of the user can be learned by the computer in a first embodiment. In a second embodiment, these habits can be set by the user according to habits of a hypothetical user that is defined in some other way. In all of these systems, the user's actions are used to set operations that the user does.

Figure 1:
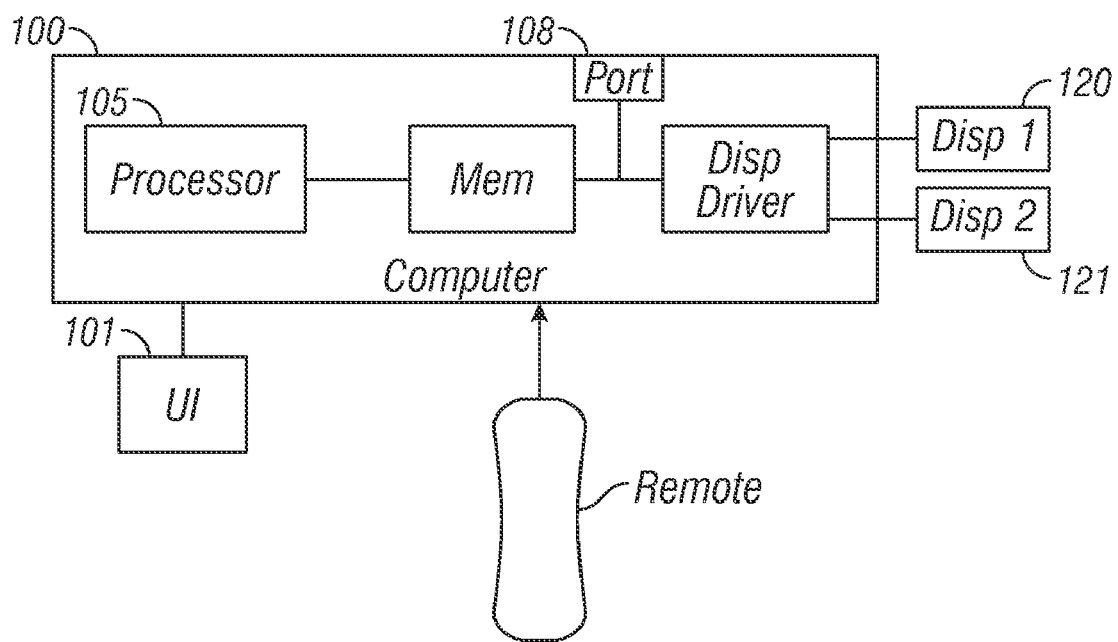
FIG. 1 shows a computer system.

FIG. 1 illustrates an embodiment, which shows an exemplary computer system 100. This includes a user interface 101, such as a keyboard, mouse, or microphone. The computer system itself has a processor 105, memory of various types 106, which can include solid-state memory, and mass storage memory such as hard drives, a display driver 107, and other port interfaces such as 108. The other port interfaces, for example, may be USB ports, external IDE, or other such external port interfaces. The display driver 107 shows driving multiple displays, here shown as 120 and 121.

Figure 2:
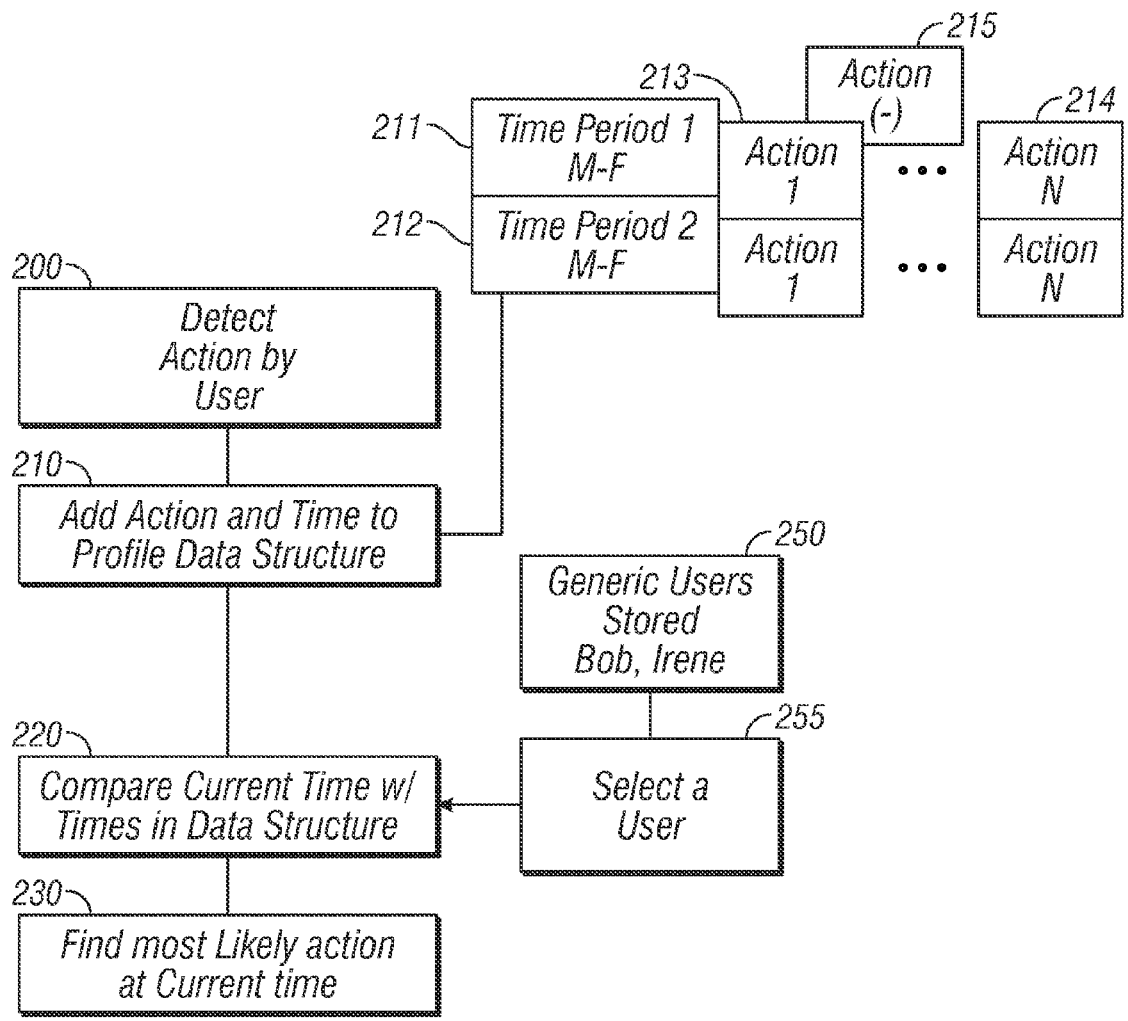
FIG. 2 shows a flowchart of operation of the computer system.

FIG. 2 illustrates an embodiment, which describes determining information about a user's specific "profile", that is, the times and ways that the user reacts and operates the device. At 200, an action is detected by the user. This action can be one of a number of different actions, such as use of the user interface, or carry out a function. At 210, the action is added to a profile. The profile may be stored as a quantized feature vector, where each item in the vector represents a specific action and/or time. While the present disclosure refers to this as a feature vector, it should be understood that any data structure that is capable of storing data and/or values can be used for this purpose.

The profile formed in 210 may record operations regarding different actions such as opening a document, and editing and/or clicking on a document, clicking on an e-mail, opening a new application, listening to a sound or picture or video, or using the user interface. Any detectable action is added to a profile of operations as a function of the time they occurred.

The time and day is quantized into different time periods. For example, the days forming time zones may be quantized into weekdays (Monday through Friday)/Saturday/Sunday. The times may be quantized into morning, lunch (11-130) afternoon, after work hours, after 9 p.m., after 11 p.m. The different times of day form different time periods during which the profile information is updated.

The feature vector may be in a form that associates the actions, and number of actions, with times that those actions occurred. The operation of an action goes first into a profile cache. That information form the profile cache is then used to update a feature vector that stores all of the information about all of the actions with all the times. For example, the profile may be updated at each time something occurs, so that each time the user carries out one of these specified actions during one of the quantized time periods, the profile is updated to indicate that the user has carried out this kind of action. Where the user has not carried out this kind of action, conversely, the feature may be decremented.

The contents of the feature vector therefore defines multiple variables, where each variable defines some 'feature' about the operation of the computer. Each time is taken as an indicia. During that indicia, any of a number of actions may be carried out, or not carried out. Each time that elapses when the user does not carry out some action, cause a counter of that item to be decremented. Each time that elapses where the user does carry out some action may cause items to be incremented. Each time period, (e.g., 12-1 pm m-f, or 1-3 pm Saturday), etc; and each action (mouse was clicked or not clicked, document was accessed or not accessed) may represent a different feature within the feature vector. These values within the feature vector increase and decrease depending on whether or not actions have occurred during the periods.

According to an embodiment, the feature vector stores information broken up into one hour increments, so that each day, each hour may define an increment. Monday through Friday 9 to 10 may be a first group. Alternatively, Monday 9 to 10 may be a first increment, while Tuesday night 9 to 10 may be a second increment.

Each time that a monitored action occurs, the increment for that action is increased at 210. Each time something does not happen, the increment for that action for that time is correspondingly decreased at 210. Over time, therefore, this builds up a profile of which actions are most likely to happen at which time.

At 220, the system compares the current time with the time periods stored in the data structure. Based on this current time, the system determines the most likely action to happen during a current time at 230. The 'current time' may include not only the exact time, but also some time reasonably contemporaneous, e.g., something that may happen within an hour, or within 15 minutes, or some other short time.

The likelihood of operations at any given time of the computer's operation can be stored as a matrix of probabilities for different times or can be determined when necessary from the raw data. However, this matrix of probabilities is not the same for all users.

For example, Bob may do different things at different times than Jane. Bob gets to work between 8 and 9 o'clock in the morning, and if the computer is on, it is likely that the first thing he will do is load e-mail. Jane gets to work between 7 and 8. She always turns her computer off at night, but the first thing she does when she gets in the morning is turn the computer on and then immediately go on to a website such as myspace. So, the different users have different things that they are likely to do at different times.

In this disclosure, there are two basic ways of carrying out the embodiment. One is by reference to a data structure that is prestored for generic users, shown as 250. Different generic users may be created, and a computer user may select the one that is closest to their own habits at 255. The specified user such as "Bob" may have information prestored about what Bob is likely to do at what time. This feature vector is actually a matrix of information which stores information about at any given time of any given day, what is the most likely thing that is going to happen? In the embodiment, the computer takes at least one action to make that thing that is going to happen more likely. In some embodiments, the computer may take an action based on what is determined by the routine to the most likely thing that is going to happen, prior to the action actually happening.

In an alternative embodiment, however, the computer forms an individual profile of the specific user, and instead of defining the computer in terms of what will happen to Bob, it defines the profile in terms of what happens to the actual user at 210, 220.

Both cases rely on this probabilistic table, which is either formed for the user specifically, or for some other user that is determined to be demographically similar to this user.

FIG. 2 illustrates the matrix, showing just a very small part of the very large matrix that is formed. For each of a plurality of different time increments such as 211, 212, a number of parameters 213, 214 etc are maintained. The parameters may be the total hours that the computer has been on, whether e-mail is running, whether word processing is running, and whether Internet is running. However, it is contemplated that there will be hundreds of such parameters, including open a document, and clicking on a document, click on an e-mail, a new application, and others.

The total probability for any action may be determined from the total value in a field, such as the value in field 213. All of this may be converted to a value that explains the probabilities at any given time that some action is going to occur.

The matrix in FIG. 2 may also have an additional dimension, that keeps track of additional things. For example, the extra dimension may represent other things like times relative to actions. These times may represent time since start up, time since specified time like 8 am, etc. For example, the box 215 may represent not just the Internet running, but more specifically, Internet running within five minutes of start up. In this embodiment, this extra dimension represents something having happened within a time period of something else having happened.

Given this n-dimensional matrix, and given a time, the n dimensional matrix can be used to determine how likely it is that a certain action will occur. It can be likely, medium likely or unlikely. Whether a feature is either likely or unlikely can form the basis on which some action is taken. For example, if it is likely that X has happened, or x will happen based on the time and other actions, then the Internet is statistically likely to be started. Responsive to this likelihood, an aggressive action towards Internet starting may be carried out. One such aggressive action could load, in non-real-time, the Internet program portions into either RAM or cache. In this way, when the user does select that the Internet should be run, the Internet application has already been loaded into fast memory, and does not have to be read completely from disk. Rather, at least part of the application is pulled from cache, enabling it to be started faster. Different amounts of granularity are also possible depending on the storage, and number of dimensions of the matrix.

For example, it is possible to store not only information indicative of the Internet being started, but also that a specific Internet site or sites which are the most likely site(s) to be brought up. In this case, an aggressive action may be not only storing the Internet application into quickly accessible memory. Content from the desired site is also stored as off-line storage. The above assumes that the most likely scenario is followed; however it is also contemplated that medium likely, and less likely scenarios are also analogously stored. If something is unlikely, no action is taken. However, a medium likely scenario may take some actions such as making an icon more prominent, or displaying it in a different place or storing it in a way that facilitates obtaining that information.

Other actions may include initiating a screensaver, shutting off some more hardware such as the hard drive, video card, certain power supplies and the like, or shutting off most of the applications other than a shell that allows execution of certain applications.

Another example is that the time increments between 11 p.m. and 8 a.m. may have very little activity. From this, the probability can be assessed that something is very unlikely. At 11 p.m., it may be "very unlikely" that the computer will be used again until 8 a.m. Accordingly, at 11 p.m., based on likelihood, the computer is put into a very aggressive sleep state until 8 a.m. At 8 a.m. the computer may be called out of the sleep state, or partially out of the sleep state, or called into a state where it is easier or faster for the computer to be used.

Now consider what happens in the unusual circumstance that the user wakes up in the middle of the night. The user does not usually does not wake up in the middle of the night, and hence the computer is turned off in a much more aggressive way than it would be turned off during times when the user is likely to be using the computer. If the computer is now being used during a time when it is normally not used, then an exception mode can be established. When a user is doing something that is unlikely, this exception can be entered for periods of 15 minutes, half an hour, or some other time period. The exception is added to the feature vector, but it has only happened maybe that one time, or at least very few times, and hence it is unlikely. However, when the user stops using the computer, is again likely that the next thing that will happen is that the user will go back to sleep, and the computer will go back to sleep until 9 am or some time like that.

But what if the user starts waking up every few nights at in the middle of the night? Each time, the operation gets added to the feature vector, and the probability of that happening becomes more likely. Then, the computer starts to prepare for that possibly happening, e.g, by using a less aggressive sleep state, and/or by loading information into memory.

Some days may be more likely for this to happen than others. For example, it may be more likely that a computer user may wake up in the middle of the night on on Saturday nights than on other nights. Based on date, time, and actions that have occurred, probabilities of actions are assessed. The computer's operations are biased towards what is likely to happen in the future. These biases are based on either what has happened before, or based on the profile.

The third dimension of the array may include things that happen within five minutes of start up, within 10 minutes of start up, within five minutes of some program occurring, within 10 of some program occurring, and the like. Granularity may be set in desired amounts, for example 30 seconds, one minute, or 15 minutes. The granularity may also scale with the distance from 0; for example a granularity of 15 seconds, 30 seconds, one minute, two minutes, five minutes, 10 minutes, et cetera. The different actions that can be taken are is virtually uncountable, but different actions may include making certain programs more prominent, moving icons to the front, loading some or all of programs into or out of memory, going into a reduced power mode of some type, enabling or disabling ports, and others.

The profile approach allows certain people may be designated or volunteer to be testers. These people have different demographic characteristics, and are characterized by their ages, regions, occupations, sex, and occupation, and the way they use the computer. A certain person may have certain habits and operate the computer in certain ways. If another person selects the person who is most like them, or most like they want to be, then the computer is configured like the computer of that person. Presumably that person has similar habits, and hence that computer is configured in a way that person might find appropriate.

The above embodiments have described computer operations in determining different aspects which can be carried out on a computer. This can include, for example, loading programs, pre-loading files and the like. The same can be used for Internet options, selecting how the Internet is used, and pre-storing different Internet sites, and the like, as off-line content. This can also be used for security, so that during times when the computer is less likely to be used for Internet access, ports can be blocked. It can be used to determine what is spam and what is phishing.

Another embodiment uses a digital video recorder as the computer. Digital video recorders typically continually record television information so that a user can use this recorded television information, to enable the user to watch and pause live TV, for example. When this is done, the media information that is being recorded is being continually stored into the system's hard drive. This may in fact cause strain and premature failure of the hard drive. It may also cause the hard drive to make excessive amounts of noise. The problem becomes even worse with so-called dual tuner digital video recorders. These devices must record two streams of information, one from each tuner, onto the hard drive. The problem becomes even worse when high definition information is being stored. However, if one simply turns off the recording process, then the user can no longer rewind or pause live TV.

According to the present application, that computer is a digital media recorder. A digital media recorder has a special button that can be used to put it in quiet mode, in which its stops the recording. However, it is unlikely that this will be used very often.

In another embodiment may use an auto quiet mode, in which, when the remote is not touched for some period of time such as two hours, the quiet mode is entered. The recorder uses this inactivity as an indication that that no user is using the recorder, since no one has touched the remote. The system may then enter a quiet mode for the hard drives, in which it stops recording either partially or completely.

In one embodiment, a phased reduction can be used, where after one hour, one of the tuners stops recording, after two hours, the tuner starts recording on the lowest possible quality setting, and after three-hours stops recording entirely. Other time periods, such as 10 minutes, can be used.

Another embodiment adds a motion sensor to the recorder and stops recording based on no motion or heat being sensed within the area.

All of these may be combined with the probabilistic system described above, where the system learns or uses a model, to probabilistically determine, at specified times, what is likely to be the best course of action. This embodiment may be very useful in a digital media recorder, because users typically watch TV only during certain times. For example, users may watch TV between 7 and 10 p.m., but it is unlikely that they are watching TV between 2 and 6 a.m. the digital video recorder may learn the users individual habits by assuming that television is being watched when either a playback program is being watched or when within 10 to 20 minutes of the remote being used.

Model users may also be used, e.g., Bob who watches TV between 7-10 pm and sleeps 12-8 (normally). Jane who also watches TV in the morning. Other model users can also be modeled and used. This system may determine an action to take based on probability of watching during a current time. For example, the system may go to full record when the probability of watching is greater than 35-50%. It may go to part record, e.g., one tuner or reduced quality, at some lower percentage.

In the media recorder embodiment, the unit may be preprogrammed with a specified profile, e.g., Bob, who primarily watches TV between 7-8 am and 6-10 pm. However, other profiles may be selectable, such as Jane who watches from 9-noon, or others. These other profiles can be selected. Also, the default profile can be modified, either manually, or by learning the user's characteristics.

In any of the embodiments above, the profiles may be manually edited. For example, the user may manually create a profile that indicates that email will be loaded at 9 am, live TV will be streamed at 7 pm, etc.

As TV and digital video recorders converge, this system may be used in a combined TV/DVR.

The general structure and techniques, and more specific embodiments which can be used to effect different ways of carrying out the more general goals are described herein.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other devices are intended to be encompassed. Communicators such as cell phones and blackberry type devices are contemplated for use with this technique. The computer may be operated during a sleep mode in some embodiments. This may operate by periodically waking up the device from sleep mode for a short time to carry out the action, or by using an auxiliary processor or coprocessor for the operations.

Also, the inventor intends that only those claims which use the words "means for" are intended to be interpreted under 35 USC 112, sixth paragraph. Moreover, no limitations from the specification are intended to be read into any claims, unless those limitations are expressly included in the claims. The communicator described herein may include any kind of computer, either general purpose, or some specific purpose computer such as a workstation. The computer may be an Intel (e.g., Pentium or Core 2 duo) or AMD based computer, running Windows XP or Linux, or may be a Macintosh computer.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A digital video recorder, comprising:
    a recording part that includes a computer device that records a video program from a live video source using a video tuner, and which allows watching the video program, allows pausing the video program during recording, and rewinding the video program during recording, said recording part storing data indicative of the video program on a memory device; and
    a detector, that detects an indication of activity,
    wherein said computer device operates based on a program running in said computer, to continually record during said indication of activity and to automatically stop at least part of the recording responsive to there being no indication of activity for a specified time period,
    wherein said computer device automatically terminates a first part of the video recording when a time since the last operation is greater than a first amount and does not automatically terminate a second part of the video recording when the time since the last operation is greater than said first amount but less than a second amount, and terminates said second part of the video recording, in addition to terminating said first part, when the time since the last operation is greater than said second amount, where the second part of the video recording stops more of the recording than said first part; and
    further comprising a profile stored on said computer device, wherein said profile is updated based on actual actions taken on the digital video recorder.

2. A digital video recorder as in claim 1, wherein said program running in said computer device determines a time since a last operation, and stops the at least part of the recording when said time is greater than a specified amount.

3. A device as in claim 1, wherein said at least part of the recording includes a quality of the recording, whereby the computer device automatically records at a first highest quality during said indication of activity, and automatically changes a quality of said recording to a second lower quality responsive to there being no indication of activity for said specified time period.

4. A device as in claim 1 wherein said at least part is a recording by one of multiple different tuners that are simultaneously recording, whereby said computer device controls recording using multiple tuners during said indication of activity, and recording using fewer than said multiple tuners responsive to there being no indication of activity for said specified time period.

5. A digital video recorder, comprising:
    a recording part that includes a computer device that records a video program and which allows watching the video program, allows pausing the video program during recording, and rewinding the video program during recording, said recording part storing data indicative of the video program on a memory device; and
    a detector, that detects an indication of activity,
    wherein said computer device is programmed to control said recording part to continually record during said indication of activity, wherein said computer device is programmed to automatically terminate a first part of the video recording when the time since the last operation is greater than a first amount, and does not automatically terminate a second part of the video recording when the time since the last operation is greater than said first amount but less than a second amount, and terminates said second part of the video recording, in addition to terminating said first part, when the time since the last operation is greater than said second amount, where the second part of the video recording terminates more recording than said first part; and further comprising a profile stored on said computer device, wherein said profile is updated based on actual actions taken on the digital video recorder.

6. A digital video recorder, comprising:

a recording part that includes a computer device that records a video program and which allows watching the video program, allows pausing the video program during recording, and rewinding the video program during recording, said recording part storing data indicative of the video program on a memory device; and said computer device storing a profile indicating a likelihood that a specified action will occur at a specified time, and wherein said computer device is programmed to operate to continually record during a time when said action is likely to happen based on said profile, and to not continuously record when said action is not likely to happen based on said profile, wherein recording is controlled to start and stop based on said likelihood, even when no action actually occurs;

wherein said computer device automatically terminates a first part of the video recording when a time since the last operation is greater than a first amount and does not automatically terminate a second part of the video recording when the time since the last operation is greater than said first amount but less than a second amount, and terminates said second part of the video recording, in addition to terminating said first part, when the time since the last operation is greater than said second amount, where the second part of the video recording stops more of the recording than said first part; and wherein said profile is updated based on actual actions taken on the digital video recorder.

7. A device as in claim 6, wherein said profile is updated based on actual actions taken on the digital video recorder.

8. A method comprising:

during a first mode, continually recording an incoming video program from a live television program source;

controlling the continually recorded video program to be played while recording and to be paused while recording, and to be rewound while recording;

detecting an indication on a device that is used to play the recorded video program; and based on said indication, using a program running on a computer for automatically changing a characteristic of the recording without user intervention, wherein said computer automatically terminates a first part of the video recording when a time since the last operation is greater than a first amount and does not automatically terminate a second part of the video recording when the time since the last operation is greater than said first amount but less than a second amount, and terminates said second part of the video recording, in addition to terminating said first part, when the time since the last operation is greater than said second amount, where the second part of the video recording stops more of the recording than said first part; and further comprising a profile which is updated based on actual actions taken on the computer.

9. A method as in claim 8, wherein said changing comprises accessing a stored profile to determine a likelihood that an action will occur, wherein said likelihood is said indication, and further comprising changing said characteristic based on said likelihood, without any physical action actually occurring.

10. A method as in claim 8, wherein said characteristic of the recording includes a quality of the recording, whereby the computer device records at a first highest quality when said indication is in a first state, and records at a second lower quality when said indication is in a second state.

11. A method as in claim 8 wherein said characteristic of the recording includes a number of multiple different tuners that are simultaneously recording, whereby said automatically terminates comprises recording using multiple tuners when said indication is in a first state, and recording using fewer than said multiple tuners when said indication is in a second state.

* * * * *